United States Patent
Ueno et al.

(10) Patent No.: US 9,692,847 B2
(45) Date of Patent: Jun. 27, 2017

(54) CONTENT DISTRIBUTION METHOD AND CONTENT DISTRIBUTION SERVER

(71) Applicant: FUJITSU LIMITED, Kawasaki-shi, Kanagawa (JP)

(72) Inventors: Hitoshi Ueno, Kawasaki (JP); Kenichi Abiru, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 385 days.

(21) Appl. No.: 14/270,450

(22) Filed: May 6, 2014

(65) Prior Publication Data

US 2014/0365501 A1 Dec. 11, 2014

(30) Foreign Application Priority Data

Jun. 6, 2013 (JP) .................................. 2013-120177

(51) Int. Cl.
*G06F 17/30* (2006.01)
*H04L 29/08* (2006.01)

(52) U.S. Cl.
CPC .... *H04L 67/2842* (2013.01); *G06F 17/30203* (2013.01); *H04L 67/1004* (2013.01)

(58) Field of Classification Search
CPC .. G06F 17/30094; G06F 17/30194–17/30209; G06F 17/30283; G06F 17/30545
USPC ........................................................ 707/770
See application file for complete search history.

(56) References Cited

U.S. PATENT DOCUMENTS

| 7,933,920 | B2* | 4/2011 | Kojima ............. G06F 17/30864 707/770 |
| 2007/0244894 | A1* | 10/2007 | St. Jacques ........... H04L 67/104 |
| 2008/0109446 | A1* | 5/2008 | Wang ..................... G06Q 30/04 |
| 2009/0327244 | A1* | 12/2009 | Rizal ................. G06F 17/30017 |
| 2010/0030840 | A1* | 2/2010 | O'Shea ................. H04L 63/123 709/201 |
| 2010/0046633 | A1 | 2/2010 | Kasai et al. |
| 2010/0169277 | A1* | 7/2010 | Shyu ..................... H04L 67/104 707/622 |

(Continued)

FOREIGN PATENT DOCUMENTS

| JP | 2008-102795 | 5/2008 |
| JP | 2010-200287 | 9/2010 |

OTHER PUBLICATIONS

Patent Abstracts of Japan, Publication No. 2008-102795, Published May 1, 2008.

(Continued)

*Primary Examiner* — Robert Beausoliel, Jr.
*Assistant Examiner* — Nirav K Khakhar
(74) *Attorney, Agent, or Firm* — Staas & Halsey LLP

(57) ABSTRACT

A content distribution method executed by a computer includes referring to a result of comparing information identifying content data stored in a storage unit with information identifying content data stored in one or more other storage units included in one or more other computers; and collecting representative image data of content data not stored in the storage unit from the one or more other storage units included in the one or more other computers storing the content data not stored in the storage unit, starting from one of the one or more other computers having a greatest number of pieces of the content data.

15 Claims, 18 Drawing Sheets

(56) References Cited

U.S. PATENT DOCUMENTS

| 2010/0235432 A1* | 9/2010 | Trojer | H04L 12/2861 |
|---|---|---|---|
| | | | 709/203 |
| 2013/0166503 A1* | 6/2013 | Chung | G06F 17/302 |
| | | | 707/610 |

OTHER PUBLICATIONS

Patent Abstracts of Japan, Publication No. 2012-200287 published Sep. 9, 2010.
Japanese Office Action dated Dec. 6, 2016 in corresponding Japanese Patent Application No. 2013-120177.

* cited by examiner

| CSID | IP |
|---|---|
| CS 300A | 10.25.100.1 |
| CS 300B | 10.26.100.1 |
| CS 300C | 10.27.100.1 |
| CS 300D | 10.28.100.1 |

| CONTENT ID | TITLE | AUTHOR | # OF REFERENCE | HASH VALUE |
|---|---|---|---|---|
| 1 | Jet | User A | 10 | 1 |
| 2 | Foot!! | User B | 4 | 3 |
| 3 | Apple | User A | 8 | 8 |
| 4 | Church | User K | 234 | 3 |

| GROUP ID | CSID |
|---|---|
| Gr 1 | CS 300A,CS 300C |
| Gr 2 | CS 300B,CS 300C |

FIG.8

| HASH VALUE | TITLE |
|---|---|
| 1 | Jet |
| 2 | |
| 3 | Foot!!, Church |
| 4 | |
| 5 | |
| 6 | |
| 7 | |
| 8 | Apple |

BIT ARRAY OF GROUP 1 OF CS 300A

| 1 | 0 | 0 | 0 | 0 | 0 | 0 | 0 |
|---|---|---|---|---|---|---|---|

Jet

FIG.11B

BIT ARRAY OF GROUP 1 OF CS 300B

| 1 | 0 | 1 | 0 | 0 | 0 | 0 | 0 |
|---|---|---|---|---|---|---|---|

Jet        Foot!!

FIG.11C

BIT ARRAY OF GROUP 1 OF CS 300C

| 1 | 0 | 0 | 0 | 1 | 0 | 1 | 1 |
|---|---|---|---|---|---|---|---|

Jet                  Dolphin     Egg Apple

FIG.11D

BIT ARRAY OF GROUP 1 OF CS 300D

| 0 | 1 | 1 | 0 | 0 | 1 | 0 | 1 |
|---|---|---|---|---|---|---|---|

Cloud Cat           Bird     Apple

FIG.16A

BIT ARRAY OF GROUP 1 OF CS 300A

| 1 | 0 | 0 | 0 | 0 | 0 | 0 | 0 |
|---|---|---|---|---|---|---|---|

Jet

FIG.16B

BIT ARRAY OF GROUP 1 OF CS 300B

| 1 | 0 | 1 | 0 | 0 | 0 | 0 | 0 |
|---|---|---|---|---|---|---|---|

Jet        Foot!!

FIG.16C

BIT ARRAY OF GROUP 1 OF CS 300C

| 1 | 0 | 0 | 0 | 1 | 0 | 1 | 1 |
|---|---|---|---|---|---|---|---|

Jet               Dolphin    Egg   Apple
                       kiwi

FIG.16D

BIT ARRAY OF GROUP 1 OF CS 300D

| 0 | 1 | 0 | 0 | 0 | 1 | 0 | 1 |
|---|---|---|---|---|---|---|---|

Cloud                Bird      Apple

CONTENT DISTRIBUTION METHOD AND CONTENT DISTRIBUTION SERVER

CROSS-REFERENCE TO RELATED APPLICATIONS

This application is based upon and claims the benefit of priority of the prior Japanese Priority Application No. 2013-120177 filed on Jun. 6, 2013, the entire contents of which are hereby incorporated by reference.

FIELD

The disclosures herein generally relate to a content distribution method and a content distribution server that distribute content data to terminal devices.

BACKGROUND

In recent years, services for sharing content data have become popular among specific users such as SNS (social networking service). Such a service accumulates shared content data to be shared, for example, among specific users, in a cache server or the like, and allows user terminal devices to refer to the shared content data in the cache server.

Incidentally, a conventional cache server deletes content data having a smaller number of references if shortage of the memory capacity occurs. Therefore, there may be cases where shared content data supposed to be shared by terminal devices is deleted on the cache server.

In this case, the cache server obtains shared content data to be shared, by searching for the data among other servers after receiving access from a terminal device until receiving a reference request. As the search method, for example, a method is known that narrows down servers to be searched for so that searching is performed only on servers that store desired files.

RELATED-ART DOCUMENTS

Patent Documents

[Patent Document 1] Japanese Laid-open Patent Publication No. 2008-102795

In recent years, the size of content data has been getting greater due to high functionality of terminal devices and high picture quality of content data. Therefore, it takes a longer time for a cache server to obtain shared content data from other servers.

SUMMARY

According to at least one embodiment of the present invention, a content distribution method executed by a computer includes referring to a result of comparing information identifying content data stored in a storage unit with information identifying content data stored in one or more other storage units included in one or more other computers; and collecting representative image data of content data not stored in the storage unit from the one or more other storage units included in the one or more other computers storing the content data not stored in the storage unit, starting from one of the one or more other computers having a greatest number of pieces of the content data.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 5 is a schematic view illustrating an example of a CS management table;

FIG. 6 is a schematic view illustrating an example of a content management table;

FIG. 7 is a schematic view illustrating an example of a group position table;

FIG. 8 is a schematic view illustrating an example of a hash table;

FIGS. 11A-11D are schematic views illustrating an example of bit arrays corresponding to content data held by cache servers according to the first embodiment;

FIGS. 16A-16D are schematic views illustrating an example of bit arrays corresponding to content data held by cache servers according to a third embodiment;

DESCRIPTION OF EMBODIMENTS

First Embodiment

Figure 1:
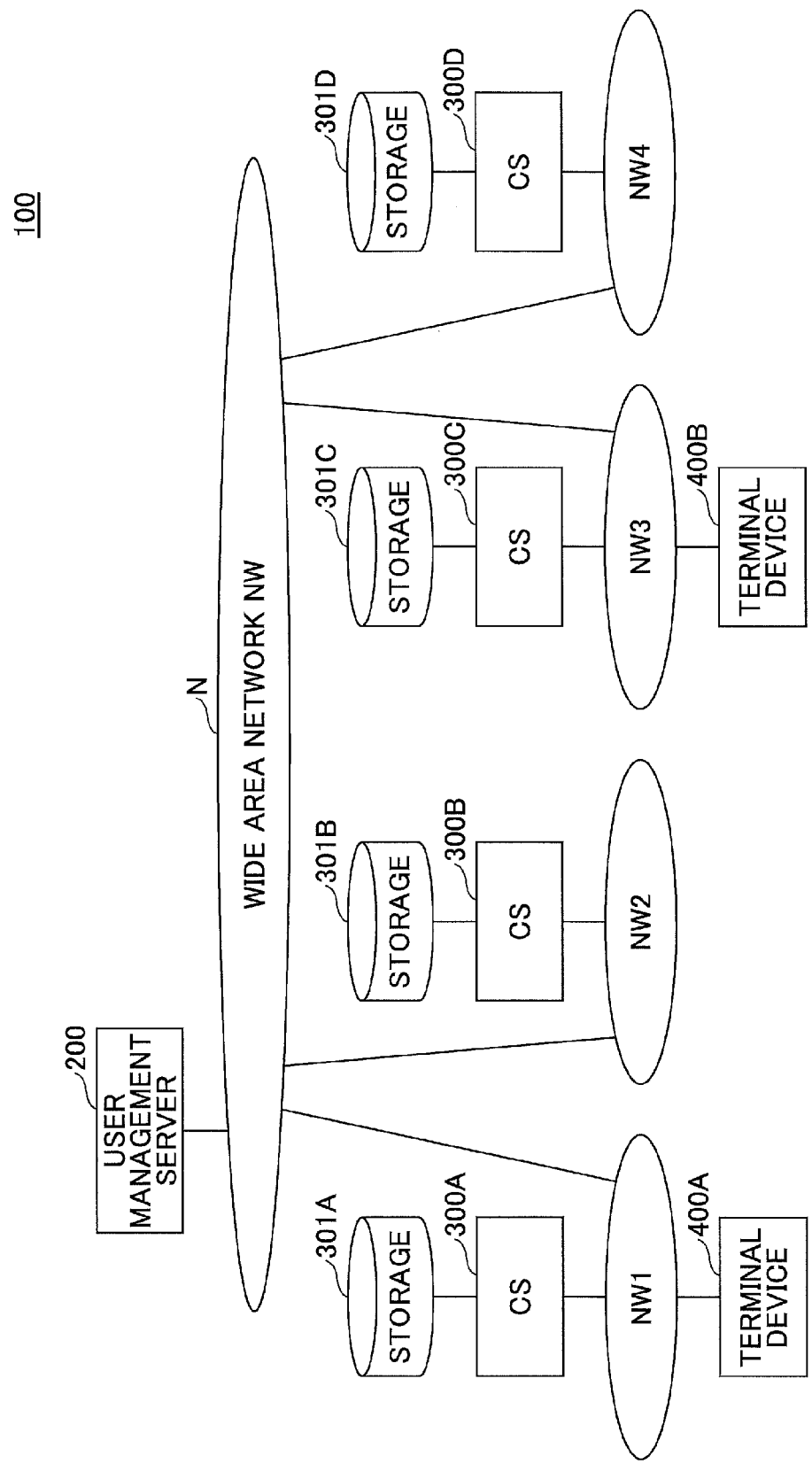
FIG. 1 is a schematic view illustrating an example of a configuration of a content distribution system.

In the following, embodiments of the present invention will be described with reference to the drawings. FIG. 1 is a schematic view illustrating an example of a configuration of a content distribution system 100.

The content distribution system 100 in the present embodiment includes a user management server 200, cache servers 300A, 300B, 300C, and 300D, storages 301A, 301B, 301C, and 301D, and terminal devices 400A and 400B. The user management server 200 is connected with a wide area network N. Note that a content server (not illustrated) that includes various content data may be connected with the wide area network N.

The cache server 300A is connected with the wide area network N via a network NW1. The cache server 300A is also connected with the storage 301A. The storage 301A stores content data to be distributed by the cache server 300A.

The cache server 300B is connected with the wide area network N via a network NW2. The cache server 300B is also connected with the storage 301B. The storage 301B stores content data to be distributed by the cache server 300B.

The cache server 300C is connected with the wide area network N via a network NW3. The cache server 300C is also connected with the storage 301C. The storage 301C stores content data to be distributed by the cache server 300C.

The cache server 300D is connected with the wide area network N via a network NW4. The cache server 300D is also connected with the storage 301D. The storage 301D stores content data to be distributed by the cache server 300D.

The terminal device 400A is connected with the cache server 300A via the network NW1, and the terminal device 400B is connected with the cache server 300C via the network NW3.

Although the four cache servers are connected with the wide area network N in the present embodiment, the number of cache servers may be arbitrarily determined. In the following description of the present embodiment, the four cache servers are referred to as the cache servers 300A, 300B, 300C, and 300D, respectively, if distinctions are required, or referred to as the cache servers 300 if no distinctions are required. Similarly, the storages 301A, 301B, 301C, and 301D are referred to as the storages 301 if no distinctions are required. Note that a storage 301 may be provided inside of a cache server 300. Similarly, the terminal devices 400A and 400B are referred to as the terminal devices 400 if no distinctions are required.

Figure 2:
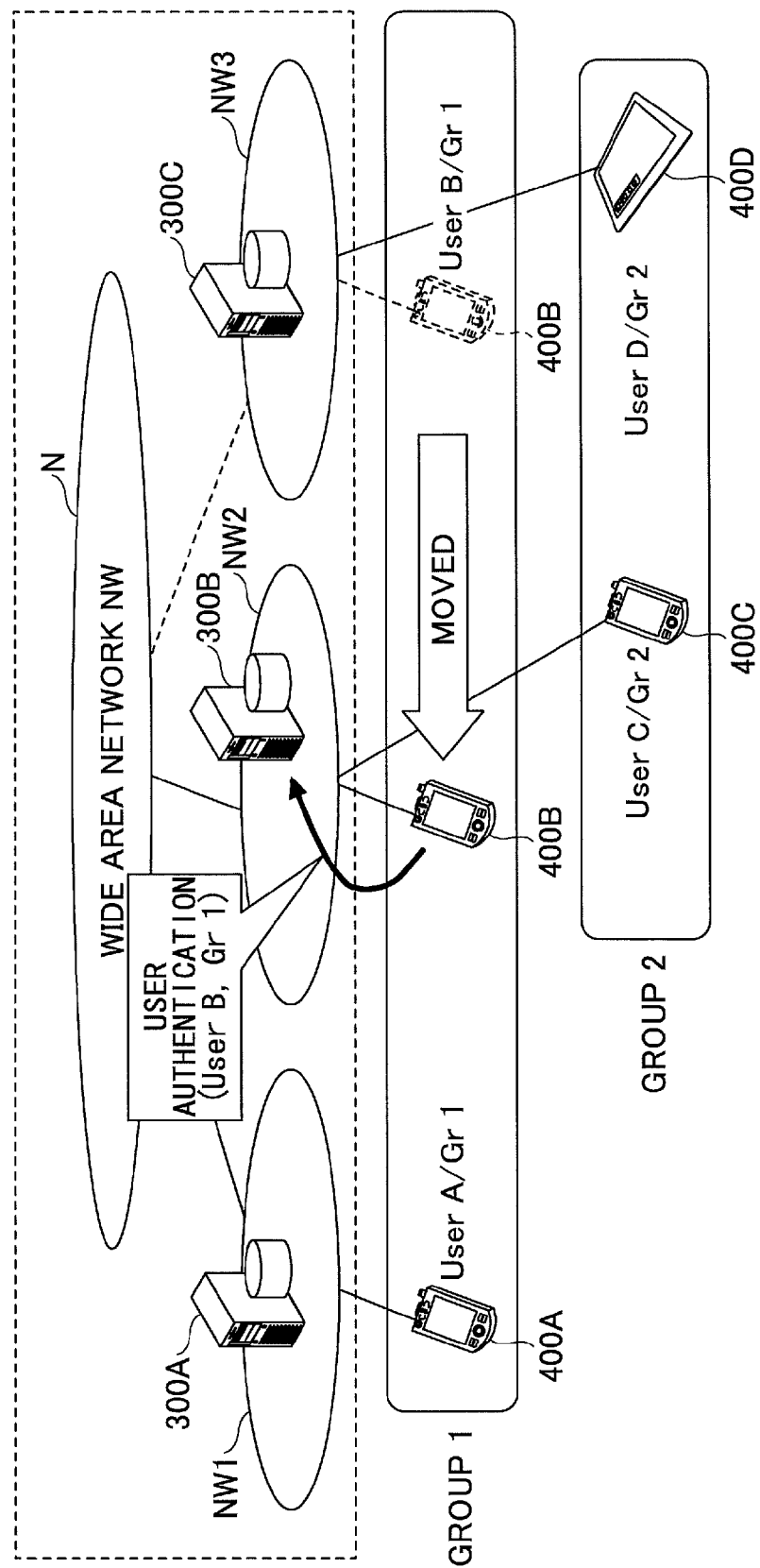
FIG. 2 is a schematic view illustrating an example of operations of a content distribution system.

In the following, with reference to FIG. 2, an example of operations of the content distribution system 100 in the present embodiment will be described. FIG. 2 is a schematic view illustrating an example of operations of the content distribution system 100.

In the content distribution system 100 in the present embodiment, for example, multiple terminal devices 400 are grouped together, and a cache server 300 distributes shared content data to be shared among the terminal devices 400 in the same group, to the terminal devices 400 in the same group. Namely, the cache server 300 in the present embodiment is a server that distributes content data to the terminal devices 400. When distributing shared content data, the cache server 300 in the present embodiment sets thumbnails of pieces of the shared content data as representative images of the pieces of the shared content data, respectively, and has the terminal devices 400 display a list of the thumbnails.

In the example in FIG. 2, the terminal device 400A is owned by a user A, the terminal device 400B is owned by a user B, and the terminal devices 400A and 400B are grouped into a group 1. The terminal device 400C is owned by a user C, the terminal device 400D is owned by a user D, and the terminal device 400C and 400D are grouped into a group 2. Also, FIG. 2 illustrates a case where the user B having the terminal devices 400B has moved from an area of the network NW3 to an area of the network NW2.

The terminal device 400A refers to the cache server 300A when obtaining shared content data of the group 1. Also, before the movement of the user B, the terminal device 400B refers to the cache server 300C when obtaining the shared content data of the group 1. Namely, the shared content data of the group 1 is accumulated in the cache servers 300A and 300C.

Also, the terminal devices 400C and 400D refer to the cache servers 300B and 300C, respectively, when obtaining the shared content data of the group 2. Namely, the shared content data of the group 2 is accumulated in the cache servers 300B and 300C.

Here, consider a case where the user B refers to the shared content data of the group 1 after moving from the area of the network NW3 to the area of the network NW2.

When referring to the shared content data after the movement to the area of the network NW2, the terminal devices 400B transmits authentication information to the cache server 300B to have the content distribution system 100 execute user authentication. At this moment, shared content data accumulated in the cache server 300B is mainly the shared content data of the group 2.

Therefore, the cache server 300B collects thumbnails of the shared content data of the group 1 from the cache servers 300A and 300C that are not included in the cache server 300B. The cache server 300B in the present embodiment collects the thumbnails after receiving the authentication information of the terminal device 400B until receiving a reference request for the shared content data of the group 1.

Then, in response to receiving the reference request from the terminal device 400B, the cache server 300B has the terminal device 400B display thumbnails of the collected shared content data of the group 1 as a list of the shared content data.

Note that although the example in FIG. 2 is described assuming that terminal devices 400 are grouped, it is not limited to that. For example, a cache server 300 may store content data referred to by individual users.

For example, consider a case where content data for the user B that is referred to by the user B is accumulated in the cache servers 300A and 300C, and the user B refers to the content data of his own in the area of the network NW2.

In this case, the cache server 300B may collect thumbnails of the content data for the user B from the other cache servers 300A and 300C to have the terminal device 400B display the thumbnails as a list of the content data for the user B. Namely, the cache server 300A in the present embodiment collects thumbnails of content data grouped for a specific group from other cache servers 300, and transmits the thumbnails to a terminal device 400. For example, if a terminal device 400 belongs to a group, the content data input to the terminal device 400 is grouped into a group that corresponds to the group of the terminal device 400. Also, if content data is distributed for each user, for example, content data is grouped for each of the users.

In the following, the cache server 300 in the present embodiment and collection of thumbnails by the cache server 300 will be described.

Figure 3:
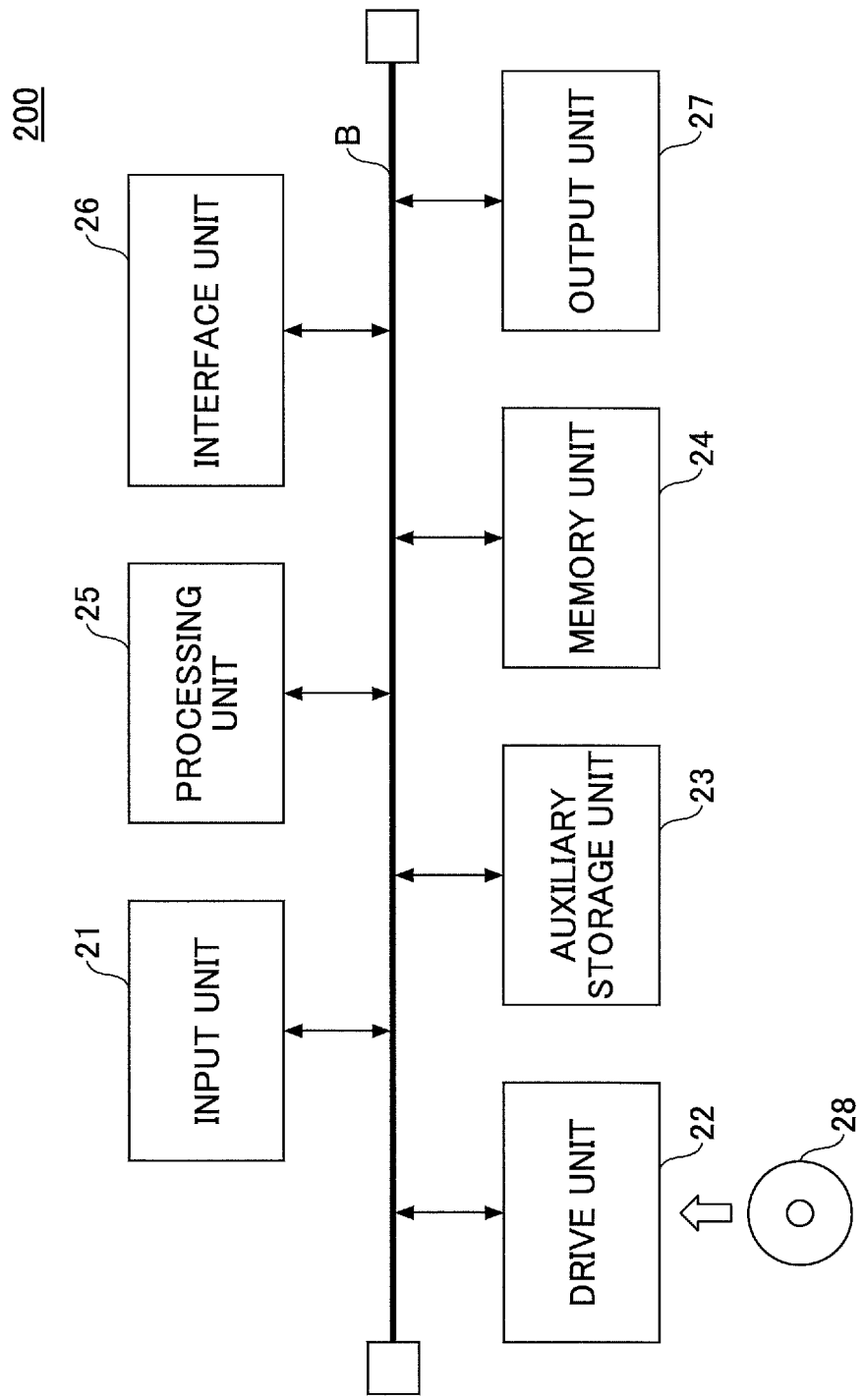
FIG. 3 is a schematic view illustrating an example of a hardware configuration of a cache server.

FIG. 3 is a schematic view illustrating an example of a hardware configuration of the cache server 300.

The cache server 300 in the present embodiment includes an input unit 21, a drive unit 22, an auxiliary storage unit 23, a memory unit 24, a processing unit 25, an interface unit 26, and an output unit 27, which are mutually connected by a bus B.

The input unit 21 includes, for example, a keyboard, a mouse, and the like that are used for inputting various signals. The output unit 27 includes, for example, a display and the like that are used for outputting various signals and displaying various information.

The interface unit 26 includes a modem, a LAN (Local Area Network) card, and the like that are used for connecting with a network.

A thumbnail collection program is at least a part of various programs that control the cache server 300. The thumbnail collection program is provided, for example, by distributing a recording medium 28, or by downloading from a network. As a recording medium 28 that records the thumbnail collection program, various types of recording media can be used including recording media that record information optically, electrically or magnetically such as a CD-ROM, a flexible disk, an optical magnetic disk, and the like, and semiconductor memories that record information electrically such as a ROM, a flash memory, and the like.

Also, when a recording medium 28 that stores the thumbnail collection program is set in the drive unit 22, the thumbnail collection program is installed on the auxiliary storage unit 23 via the drive unit 22 from the recording medium 28. The thumbnail collection program downloaded from a network is installed on the auxiliary storage unit 23 via the interface unit 26.

The auxiliary storage unit 23 stores the installed thumbnail collection program, and also stores required files, data, and the like. The auxiliary storage unit 23 in the present embodiment may be, for example, a storage 301. The memory unit 24 reads and stores the thumbnail collection program from the auxiliary storage unit 23 when activating a computer. And the processing unit 25 implements various processes, which will be described later, following the thumbnail collection program stored in the memory unit 24.

Figure 4:
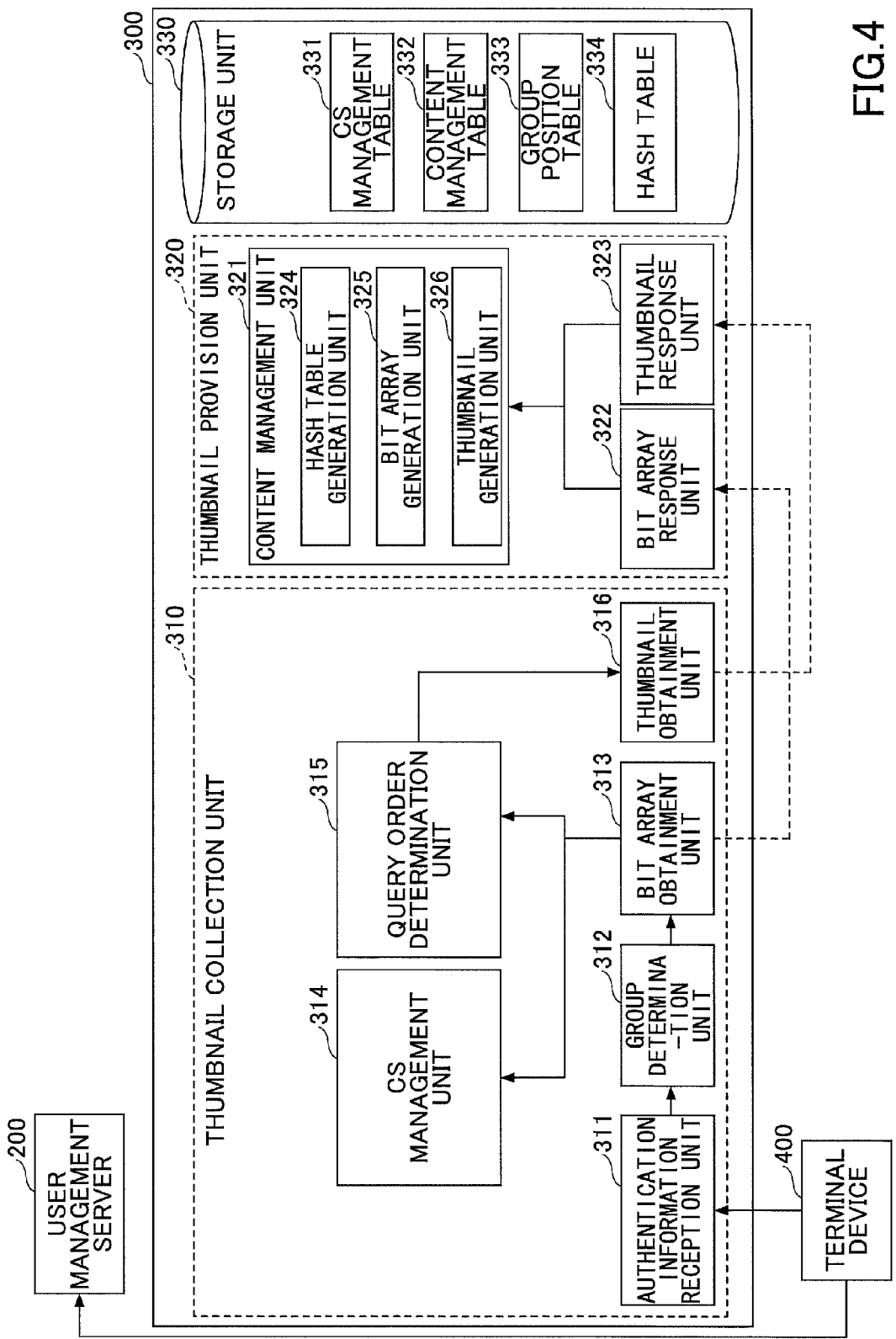
FIG. 4 is a schematic view illustrating functions of a cache server according to a first embodiment.

Next, functions of the cache server 300 will be described according to the present embodiment with reference to FIG. 4. FIG. 4 is a schematic view illustrating functions of the cache server 300 according to the first embodiment.

The cache server 300 in the present embodiment includes a thumbnail collection unit 310, a thumbnail provision unit 320, and a storage unit 330. The thumbnail collection unit 310 collects thumbnails from the other cache servers 300. The thumbnail provision unit 320 provides thumbnails to the other cache servers 300 in response to obtainment requests for the thumbnails from the other cache servers 300.

The storage unit 330 stores various tables that are referred to by the cache server 300 when executing processes described later. Specifically, the storage unit 330 stores a cache server (CS) management table 331, a content management table 332, a group position table 333, and a hash table 334. The tables will be described in detail later. The storage unit 330 is a predetermined storage area provided in, for example, the auxiliary storage unit 23 or the memory unit 24.

The thumbnail collection unit 310 in the present embodiment includes an authentication information reception unit 311, a group determination unit 312, a bit array obtainment unit 313, a CS management unit 314, a query order determination unit 315, and a thumbnail obtainment unit 316.

The authentication information reception unit 311 in the present embodiment receives authentication information transmitted from a terminal device 400. The authentication information in the present embodiment includes, for example, user identification information (referred to as a "user ID" below) for identifying the user of the terminal device 400, and group identification information (referred to as a "group ID" below) for distinguishing a group assigned to the terminal device 400.

The group determination unit 312 determines whether a terminal device 400 exists in the area of a network NW that has the same group ID as the group ID included in the authentication information received at the authentication information reception unit 311.

Specifically, the group determination unit 312 refers to, for example, the group position table 333 in the storage unit 330 to determine whether a group ID exists in the group position table 333 that is equivalent to the received group ID. If a corresponding group ID does not exist, the group determination unit 312 determines that no terminal devices 400 exist in the area of the network NW that have the same group as the received group. Then, the group determination unit 312 stores the received group ID in the group position table 333 to update the group position table 333. Moreover, the group determination unit 312 transmits the updated group position table 333 to all cache servers 300 in the content distribution system 100.

The bit array obtainment unit 313 obtains bit arrays (described later) from other cache servers 300 depending on a determination result by the group determination unit 312. The bit array will be described in detail later. The bit array obtainment unit 313 in the present embodiment obtains bit arrays by referring to IP addresses of the other cache servers 300 managed by, for example, the CS management unit 314.

The CS management unit 314 manages the CS management table 331 that stores IP addresses of the cache servers 300 in the content distribution system 100. The CS management unit 314 transfers the IP addresses of the other cache servers 300 to the bit array obtainment unit 313 in response to a request from the bit array obtainment unit 313.

The query order determination unit 315 determines an order of obtainment requests for thumbnails to be made to the other cache servers 300 based on the bit arrays obtained by the bit array obtainment unit 313. A process executed by the query order determination unit 315 will be described in detail later. The thumbnail obtainment unit 316 obtains thumbnails from the other cache servers 300.

The thumbnail provision unit 320 in the present embodiment includes a content management unit 321, a bit array response unit 322, and a thumbnail response unit 323.

The content management unit 321 manages content data stored in the storage 301. The content management unit 321 also manages the content management table 332. Specifically, the content management unit 321 updates the content management table 332 so that pieces of the content data having fewer numbers of references are deleted in order, for example, if the remaining capacity of the storage 301 is less than a predetermined value. The content management unit 321 also updates the content management table 332 when new content data is downloaded to the cache server 300.

The content management unit 321 includes a hash table generation unit 324, a bit array generation unit 325, and a thumbnail generation unit 326.

The hash table generation unit 324 refers to the content management table 332, and generates the hash table 334. The hash table generation unit 324 in the present embodiment may update the hash table 334 every time the content management table 332 is updated. The hash table generation unit 324 will be described in detail later.

The bit array generation unit 325 refers to the hash table 334, and generates a bit array that indicates which pieces of content data are held by the cache server 300. The bit array generation unit 325 will be described in detail later.

The thumbnail generation unit 326 generates thumbnails from the content data. A thumbnail in the present embodiment is, for example, a representative image that represents a piece of content data, and a part of the piece of the content data.

In response to an obtainment request for a bit array from another cache server 300, the bit array response unit 322 transmits a bit array generated by the bit array generation unit 325 to the other cache server 300 that has made the request.

In response to an obtainment request for thumbnails from another cache server 300, the thumbnail response unit 323 transmits thumbnails generated by the thumbnail generation unit 326 to the other cache server 300 that has made the request.

Next, various tables stored in the storage unit 330 in the present embodiment will be described with reference to FIGS. 5-8. FIG. 5 is a schematic view illustrating an example of the CS management table 331.

In the CS management table 331 in the present embodiment, cache server identification information (referred to as a "CSID" below) for identifying a cache server 300 is associated with the IP address of the cache server 300.

FIG. 6 is a schematic view illustrating an example of the content management table 332. In the content management table 332 in the present embodiment, content identification information (content ID) for identifying a piece of content data is associated with data items including the title, author, number of references, and hash value of the piece of the content data. The hash value in the present embodiment is a value obtained from the title and author of the piece of content data calculated by a function called a hash function, which is a representative value of the piece of the content data.

If the cache server 300 obtains a new piece of content data, for example, the content management unit 320 in the present embodiment may calculate the hash value of the piece of the content data obtained when updating the content management table 332.

Also, the content management table 332 in the present embodiment may be provided for each group ID that is assigned to the terminal devices 400. FIG. 7 is a schematic view illustrating an example of a group position table. The group position table 333 in the present embodiment is a table held by all cache servers 300 in the content distribution system 100. In the group position table 333, a group ID assigned to the terminal devices 400 is associated with cache servers 300.

In the example in FIG. 7, it can be seen that terminal devices 400 assigned the group ID of Gr 1 are in the area of the network NW1 with which the cache server 300A is connected, and also in the area of the network NW3 with which the cache server 300C is connected. Similarly, in the example in FIG. 7, it can be seen that terminal devices 400 assigned the group ID of Gr 2 are in the area of the network NW2 with which the cache server 300B is connected, and also in the area of the network NW3 with which the cache server 300C is connected. Note that it is assumed that, for example, the group ID of the group 1 is Gr 1, and the group ID of the group 2 is Gr 2 in the present embodiment.

The cache server 300 in the present embodiment transmits the group position table 333 to all cache servers 300 every time the group determination unit 312 updates the group position table 333.

FIG. 8 is a schematic view illustrating an example of the hash table 334. The hash table 334 in the present embodiment associates a hash value with the title of a piece of content data in the content management table 332. The hash table 334 in the present embodiment is generated by the hash table generation unit 324.

The example in FIG. 8 is generated by the hash table generation unit 324 with reference to the content management table 332 in FIG. 6. In the hash table 334, the title of a piece of content data having the hash value of 1 is "Jet", and the titles of pieces of content data having the hash value of 3 are "Foot!!" and "Church".

Note that a hash value may be greater than 8 although the hash values in FIG. 8 are up to 8.

Figure 9:
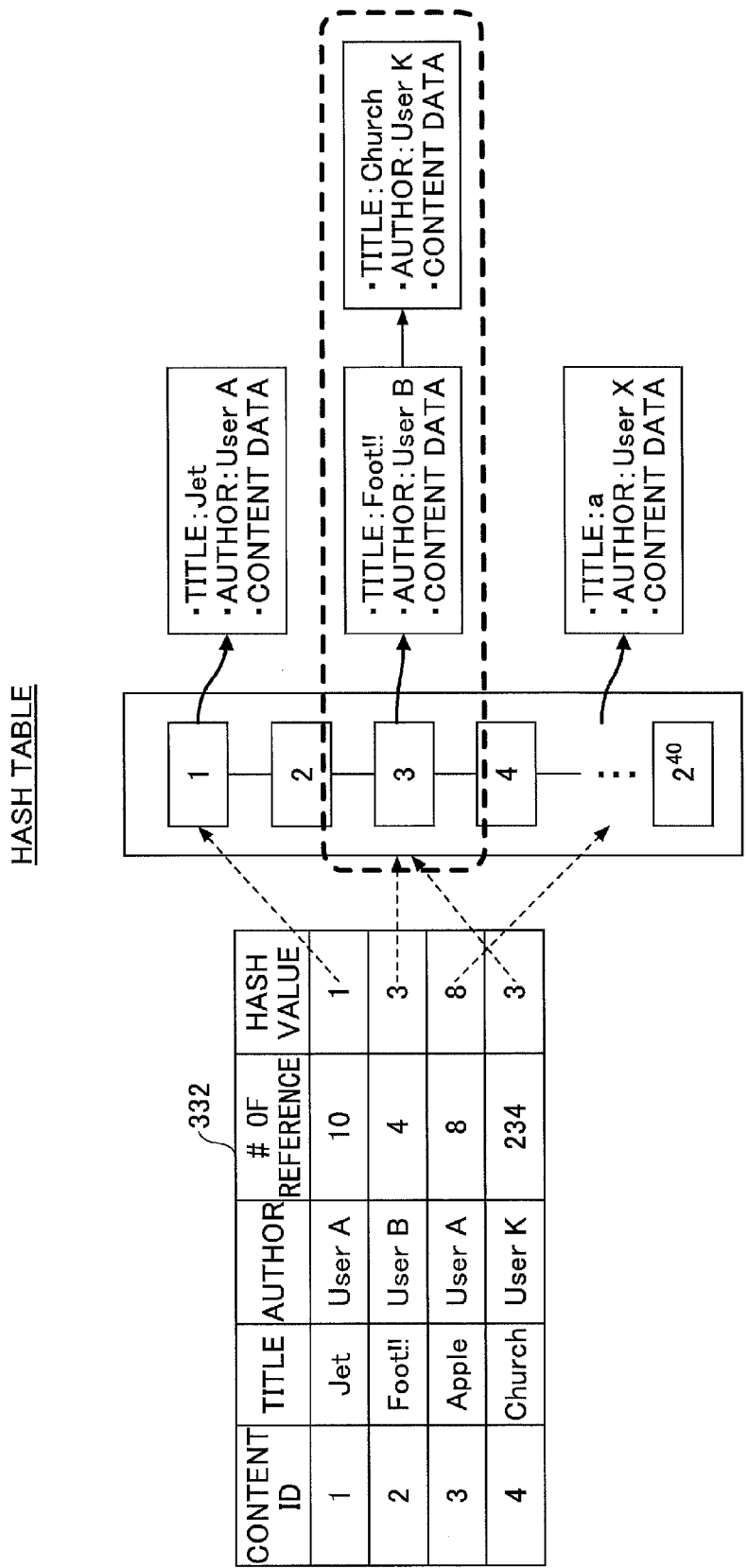
FIG. 9 is a schematic view illustrating usage of a hash table.

In the following, the hash table 334 in the present embodiment will be further described with reference to FIG. 9. FIG. 9 is a schematic view illustrating usage of the hash table 334.

The hash table generation unit 324 in the present embodiment refers to the content management table 332, extracts the title of a piece of the content data corresponding to a hash value to associate the title with the hash value.

For example, in the content management table 332, a piece of content data having the hash value of 1 is a piece of content data having the content ID of 1. Therefore, the hash table generation unit 324 associates the title of the piece of content data having the content ID of 1 with the hash value of 1.

In the content management table 332, there are no pieces of content data having the hash value of 2. Therefore, the hash table generation unit 324 associates no pieces of data with the hash value 2.

In the content management table 332, pieces of content data having the hash value of 3 are pieces of content data having the content ID of 2 and the content ID of 4. Therefore, the hash table generation unit 324 associates the titles of the pieces of content data having the content ID of 2 and the content ID of 4 with the hash value 3.

Figure 10:
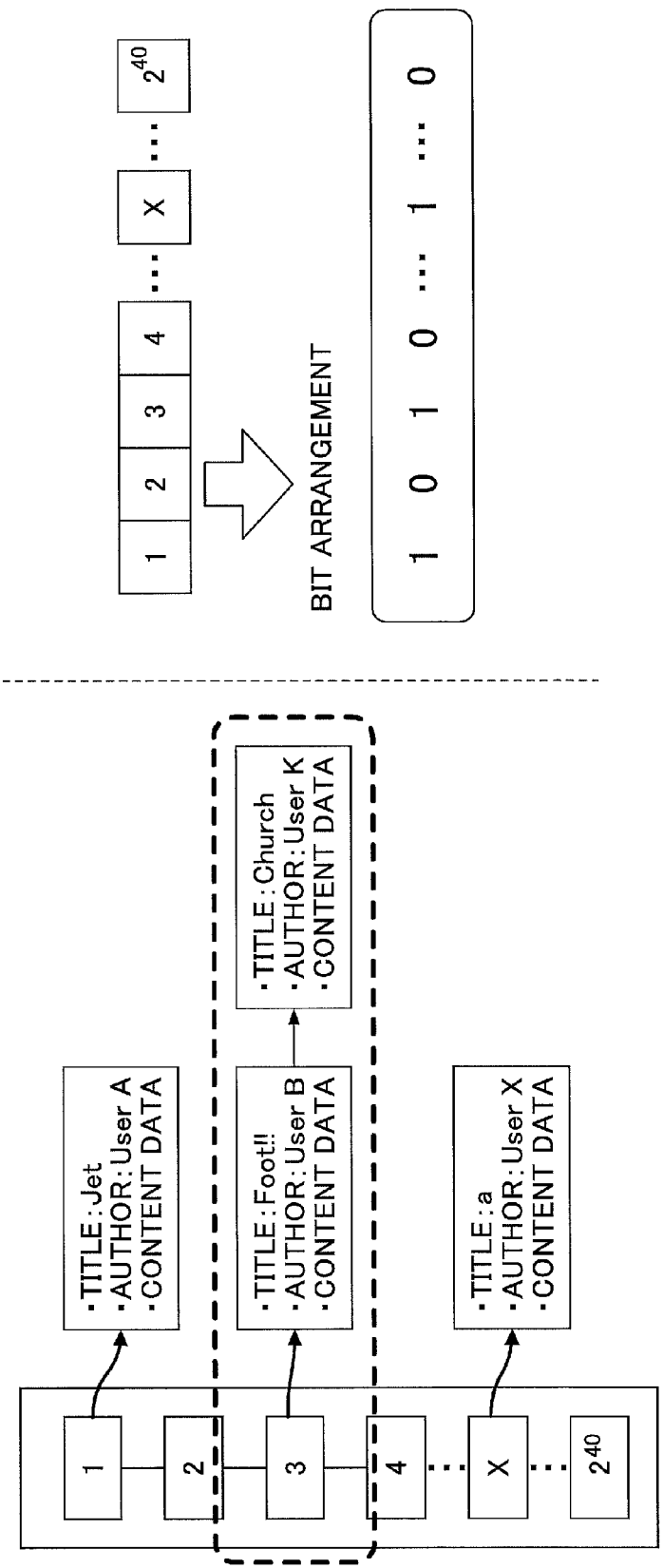
FIG. 10 is a schematic view illustrating generation of a bit array.

Next, generation of a bit array by the bit array generation unit 325 in the present embodiment will be described with reference to FIG. 10. FIG. 10 is a schematic view illustrating generation of a bit array.

The bit array generation unit 325 in the present embodiment generates a bit array, or an array of binary values, from the hash table 334.

The bit array generation unit 325 in the present embodiment generates a bit array that has the number of bits equivalent to a maximum value of hash values. For example, in the example in FIG. 10, the maximum value of the hash values is $2^{40}$. Therefore, a bit array generated by the bit array generation unit 325 is a bit array having $2^{40}$ bits.

The bit array generation unit 325 in the present embodiment sets bits that correspond to hash values having associated with titles to 1, and sets bits that correspond to hash values not having associated with titles to 0.

In the example in FIG. 10, the hash values 1 and 3 are associated with the respective titles. Therefore, the bit array generation unit 325 sets the first and third bits to 1 in the bit array. Also, in the example in FIG. 10, the hash value 2 is associated with no title. Therefore, the bit array generation unit 325 sets the second bit to 0 in the bit array. Namely, each bit in a bit array in the present embodiment designates whether there are any associated pieces of content data.

As described above, by representing existence of pieces of content data with a binary-valued bit array using hash values as indices, it is possible to search for cache servers 300 that have pieces of content data not accumulated in a specific cache server 300 within a short time according to the present embodiment. Namely, the bit array in the present embodiment is information that identifies pieces of content data accumulated in a cache server 300.

FIGS. 11A-11D are schematic views illustrating an example of bit arrays corresponding to content data held by cache servers according to the first embodiment.

FIG. 11A illustrates a bit array that corresponds to content data held in the cache server 300A. The cache server 300A holds a piece of content data that has the hash value of 1 and the title "Jet". Therefore, the bit array of the cache server 300A has the bit value of 1 at the first bit and the bit value of 0 at the second bit and after.

FIG. 11B illustrates a bit array that corresponds to content data held in the cache server 300B. The cache server 300B holds a piece of content data that has the hash value of 1 and the title "Jet", and another piece of content data that has the hash value of 3 and the title "Foot!!". Therefore, the bit array of the cache server 300B has the bit value of 1 at the first and third bits and the bit value of 0 at the other bits.

FIG. 11C illustrates a bit array that corresponds to content data held in the cache server 300C. The cache server 300C holds a piece of content data that has the hash value of 1 and the title "Jet", and another piece of content data that has the hash value of 5 and the title "Dolphin". The cache server 300C also holds a piece of content data that has the hash value of 7 and the title "Egg", and another piece of content data that has the hash value of 8 and the title "Apple". Therefore, the bit array of the cache server 300C has the bit value of 1 at the first, fifth, seventh and eighth bits and the bit value of 0 at the other bits.

FIG. 11D illustrates a bit array that corresponds to content data held in the cache server 300D. The cache server 300D holds a piece of content data that has the hash value of 2 and the title "Cloud", and another piece of content data that has the hash value of 3 and the title "Cat". The cache server 300D also holds a piece of content data that has the hash value of 6 and the title "Bird", and another piece of content data that has the hash value of 8 and the title "Apple". Therefore, the bit array of the cache server 300D has the bit value of 1 at the second, third, sixth and eighth bits and the bit value of 0 at the other bits.

In the following, operations of the cache server 300A will be described in which the cache server 300A receives authentication information from a terminal device 400 when content data held by the cache servers 300 have states as illustrated in FIGS. 11A-11D.

Figure 12:
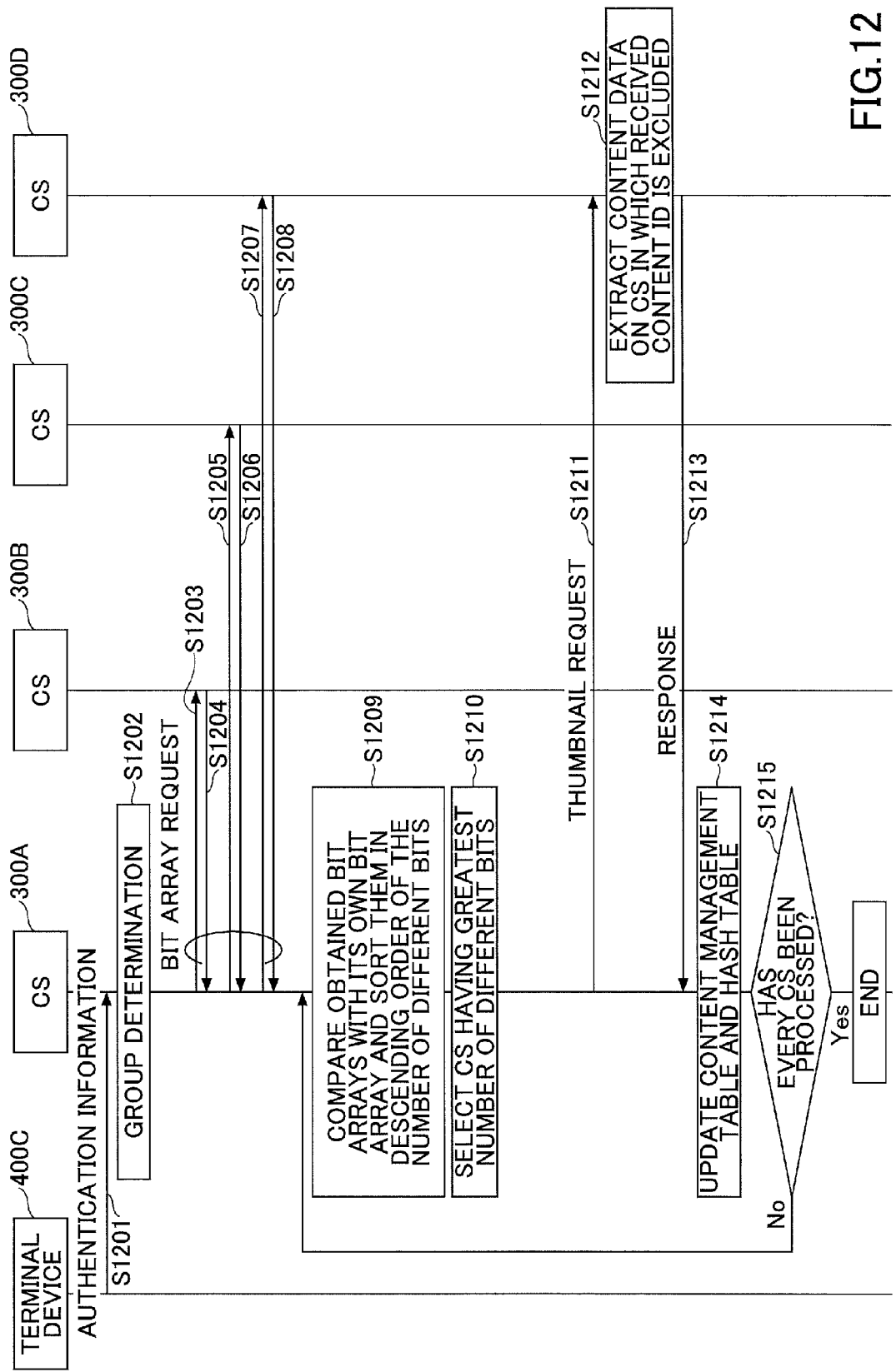
FIG. 12 is a sequence chart illustrating operations of a cache server according to the first embodiment.

FIG. 12 is a sequence chart mainly illustrating operations of the cache server 300A according to the first embodiment. FIG. 12 illustrates operations of the cache server 300A when the user C having the terminal device 400C moves from the area of the network NW2 to the area of the network NW1.

In the content distribution system 100 in the present embodiment, the terminal device 400C transmits authentication information to the cache server 300A (Step S1201). Note that the terminal device 400C in the present embodiment may transmit the user ID to the user management server 200 when transmitting the authentication information to the cache server 300A.

Having received the authentication information at the authentication information reception unit 311, the cache server 300A has the group determination unit 312 determine a group (Step S1202). Specifically, the group determination unit 312 refers to the group position table 333 to determine whether a terminal device 400 exists in the area of the network NW1 that has the same group ID as the group ID included in the authentication information.

For example, if the group ID of Gr 2 is included in the authentication information received at Step S1201, the group determination unit 312 determines whether a terminal device 400 exists in the area of the network NW1 that has the group ID of Gr 2. If no terminal device 400 exists in the area of the network NW1 that has the group ID of Gr 2, the cache server 300A in the present embodiment executes a process which will be described later. Also, if a terminal device 400 exists in the area of the network NW1 that has the group ID of Gr 2, the cache server 300A in the present embodiment may not execute the process which will be described later.

If no corresponding group ID exists in the group position table 333, the cache server 300A makes obtainment requests for bit arrays to the other cache servers 300 to obtain the bit arrays from the other cache servers 300 (Steps S1203-1208). Specifically, the cache server 300A has the CS management unit 314 refer to the CS management table 331 to obtain IP addresses of the other cache servers 300. The bit array obtainment unit 313 makes the obtainment requests for bit arrays to the obtained IP addresses of the other cache servers 300 to obtain the bit arrays.

Note that the cache server 300A makes the obtainment requests for bit arrays that are to be generated from the content management table 332 corresponding to the group ID included in the authentication information. For example, if the group ID of Gr 2 is included in the authentication information, the bit array obtainment unit 313 obtains a bit array that is generated from the content management table 332 that manages shared content data shared by Gr 2.

Next, the cache server 300A has the query order determination unit 315 compare its own bit array with each of the obtained bit arrays. Then, based on the number of bits having 1 when taking logical exclusive OR with bits having 0 in its own bit array, the cache server 300A determines a query order to send to the other cache servers 300 (Step S1209).

In the following, a process at Step S1209 will be described. The cache server 300A in the present embodiment has the bit array generation unit 325 refer to the hash table 334 generated from the content management table 332 corresponding to Gr 2 to generate a bit array. Next, the query order determination unit 315 compares its own bit array with each of the bit arrays obtained from the other cache servers 300.

Specifically, the query order determination unit 315 in the present embodiment compares its own bit array with each of the bit arrays obtained from the other cache servers 300 for each bit in terms of respective bit values at the bit.

Then, the query order determination unit 315 determines a query order of making obtainment requests for thumbnails, prioritizing a cache server 300 that has transmitted the bit array including a greater number of bits having 1 when taking logical exclusive OR with bits having 0 in its own bit array.

The bit array generated by the cache server 300A has the bit value of 1 at the first bit, and the bit values of 0 at the second bit and after (see FIG. 11A). Namely, the cache server 300A holds a piece of content data corresponding to the hash value 1.

Also, the bit array obtained from the cache server 300B has the bit values of 1 at the first and third bits (see FIG. 11B). Therefore, the cache server 300B holds the piece of content data corresponding to the hash value 1, and a piece of content data corresponding to the hash value 3.

In the bit array obtained from the cache server 300B, the number of bits having 1 when taking logical exclusive OR with bits having 0 in the bit array of the cache server 300A is one, which counts the third bit. Namely, the cache server 300B does not hold content data corresponding to the hash value 3 that is not held in the cache server 300A.

Also, the bit array obtained from the cache server 300C has the bit values of 1 at the first, fifth, seventh, and eighth bits (see FIG. 11C). Therefore, the cache server 300C holds the piece of content data corresponding to the hash value 1, and pieces of content data corresponding to the hash values 5, 7, and 8. Also, in the bit array obtained from the cache server 300C, the number of bits having 1 when taking logical exclusive OR with bits having 0 in the bit array of the cache server 300A is three, which counts the fifth, seventh, and eighth bits. Namely, the cache server 300C holds the pieces of content data corresponding to the hash values 5, 7, and 8 that are not held in the cache server 300A.

Also, the bit array obtained from the cache server 300D has the bit values of 1 at the second, third, sixth, and eighth bits (see FIG. 11D). Therefore, the cache server 300D holds pieces of content data corresponding to the hash values 2, 3, 6, and 8. Also, in the bit array obtained from the cache server 300D, the number of bits having 1 when taking logical exclusive OR with bits having 0 in the bit array of the cache server 300A is four, which counts the second, third, sixth, and eighth bits. Namely, the cache server 300D holds the pieces of content data corresponding to the hash values 2, 3, 6, and 8 that are not held in the cache server 300A.

From the above comparison result, the cache server 300D turns out to be a cache server 300 that has the bit array with the greatest number of bits having 1 when taking logical exclusive OR with bits having 0 in the bit array of the cache server 300A. Therefore, the query order determination unit 315 in the present embodiment selects the cache server 300D as a cache server 300 to which a first query is to be made (Step S1210).

Next, the thumbnail obtainment unit 316 makes an obtainment request for thumbnails to the selected cache server 300D (Step S1211). At this moment, the thumbnail obtainment unit 316 transmits the group ID included in the authentication information, and content IDs stored in the content management table 332 that is associated with the group ID, along with the obtainment request for thumbnails.

In response to receiving the obtainment request for thumbnails, the cache server 300D refers to the content management table 332 associated with the group ID to extract content data that excludes pieces corresponding to the received content IDs. Then, the cache server 300D generates thumbnails of the extracted content data (Step S1212). Next, the cache server 300D transmits a list of generated thumbnails to the cache server 300A (Step S1213).

Having received the list of thumbnails, the cache server 300A updates the content management table 332 and the hash table 334 (Step S1214). Next, the cache server 300A determines whether lists of thumbnails are obtained from all cache servers 300 from which the bit arrays have been obtained (Step S1215).

If it is determined at Step S1215 that the lists of thumbnails are obtained from all cache servers 300, the cache server 300A ends collection of thumbnails. If it is determined at Step S1215 that the lists of thumbnails are not obtained from all cache servers 300, the cache server 300A goes back to Step S1209. At this moment, the cache server 300A may have the query order determination unit 315 delete the comparison result of the bit arrays, which has been calculated for the other cache servers 300 to obtain the lists of thumbnails.

When receiving a reference request for content data from the terminal device 400 following the reception of authentication information from the terminal device 400, the cache server 300A in the present embodiment has the terminal device 400 display a list of thumbnails collected as a list of content data. Namely, a thumbnail in the present embodiment is a representative image that represents a piece of content data.

If a thumbnail is selected among the list of thumbnails at the terminal device 400, the cache server 300A transfers the piece of content data corresponding to the selected thumbnail to the terminal device 400.

As described above, the cache server 300A collects thumbnails as many as possible until receiving a reference request for content data, by obtaining thumbnails starting from a cache server 300 that has more pieces of content data than other cache servers 300 which are not held in the cache server 300A according to the present embodiment.

Note that although the above description assumes that the group ID is included in the authentication information transmitted by a terminal device 400 in the example in FIG. 12, it is not limited to that. In the following, a case will be described with reference to FIG. 13 where a group ID is not included in authentication information.

Figure 13:
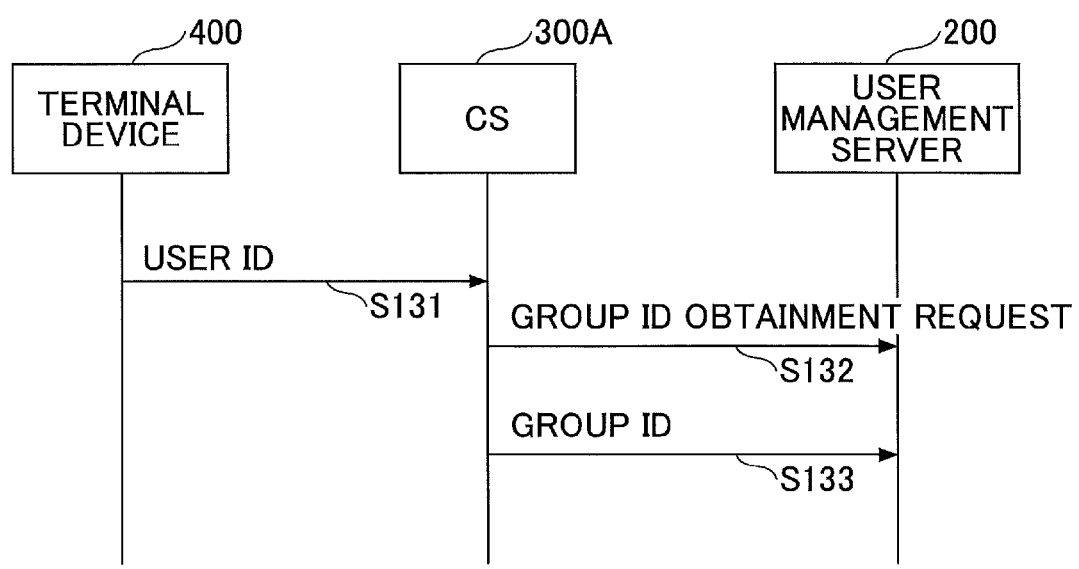
FIG. 13 is a sequence chart illustrating a process for obtaining a group ID by a cache server.

FIG. 13 is a sequence chart illustrating a process for obtaining a group ID by the cache server 300.

When a terminal device 400 transmits authentication information to the cache server 300A (Step S131), the cache server 300A has the authentication information reception unit 311 determine whether a group ID is included in the received authentication information. If a group ID is not included in the received authentication information, the cache server 300A makes an obtainment request for a group ID with a received user ID to the user management server 200 (Step S132).

The user management server 200 in the present embodiment includes a user information table in which, for example, a user ID is associated with a group ID. The user management server 200 in the present embodiment refers to the user information table, extracts a group ID associated with the received user ID included in a group ID obtainment request, and transmits the extracted group ID to the cache server 300A (Step S133). The cache server 300A may update the group position table 333 when obtaining the group ID of the terminal device 400.

As described above, authentication information may not include a group ID in the present embodiment. Note that the user information table in the present embodiment may be stored in the user management server 200 beforehand.

Figure 14A:
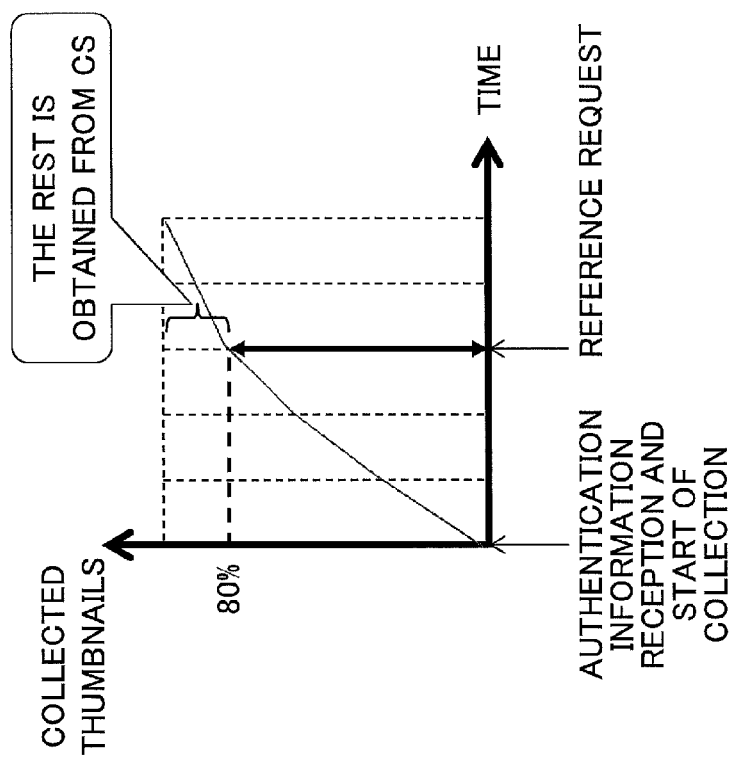
FIGS. 14A-14B are schematic views illustrating time taken for collecting thumbnails.
Figure 14B:
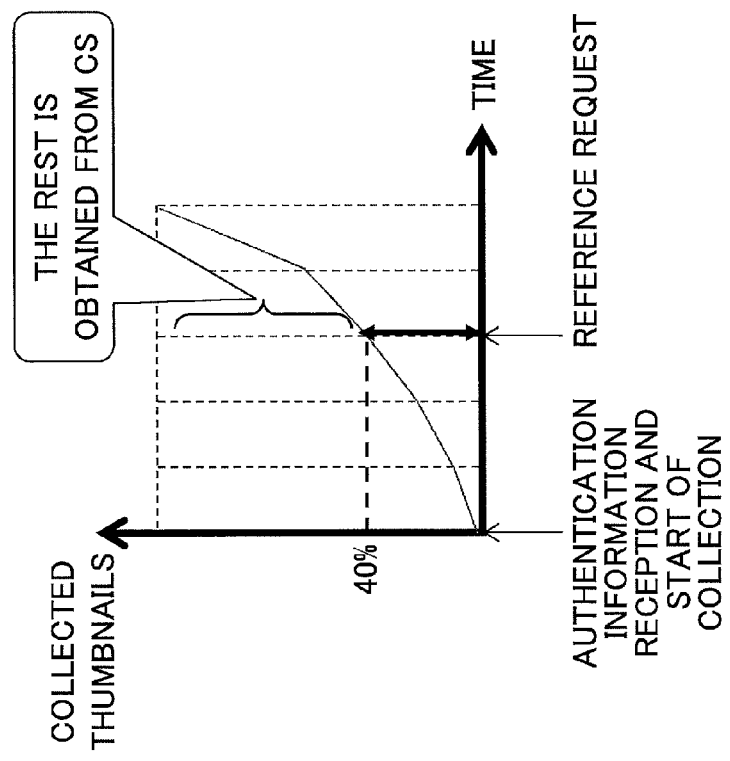

In the following, time taken by the cache server 300A in the present embodiment for collecting thumbnails will be described with reference to FIGS. 14A-14B. FIGS. 14A-14B are schematic views illustrating time taken for collecting thumbnails. FIG. 14A illustrates a case where an order of requests is not taken into consideration when making obtainment requests for thumbnails to cache servers 300 that hold content data to be collected. FIG. 14B illustrates a case where obtainment requests for thumbnails are made starting from a cache server 300 that has more pieces of content data to be collected than the others. In FIGS. 14A-14B, the horizontal axis represents time, and the vertical axis represents the number of collected thumbnails.

In FIG. 14A, 40% of all thumbnails are collected after the cache server 300A starts collection of thumbnails upon a reception of authentication information, until receiving a reference request. Therefore, in this case, the cache server 300A obtains thumbnails of content data that are not collected, from content servers and the like connected with the wide area NW until receiving a reference request. Therefore, in this case, until the cache server 300A obtains the remaining 60% of content data from the content servers and the like, the cache server 300A cannot have a terminal device 400 display a list of thumbnails for all pieces of content data.

In FIG. 14B, 80% of all thumbnails are collected after the cache server 300A starts collection of thumbnails upon a reception of authentication information, until receiving a reference request, which is a much greater percentage than that obtained in the case of FIG. 14A.

In the case of FIG. 14B, the cache server 300A obtains the remaining 20% of content data from the content servers and the like, and the cache server 300A can have a terminal device 400 display a list of thumbnails for all pieces of content data within a shorter length of time.

As described above, when collecting thumbnails of content data within a specific group by comparing bit arrays, the cache server 300 in the present embodiment collects thumbnails starting from a cache server 300 that has a greater number of pieces of content data than the others that are not included in the requesting cache server 300. Therefore, in the present embodiment, more thumbnails, or more representative images of content data, can be collected until receiving a reference request from a terminal device 400.

Second Embodiment

In the following, the second embodiment will be described with reference to the drawing. The second embodiment differs from the first embodiment in that comparison of bit arrays is executed by each cache server 300 that receives an obtainment request for a bit array. Therefore, in the following description of the second embodiment, only different points from the first embodiment will be described, elements having substantially the same functional configurations are assigned the same numerical codes as in the description of the first embodiment, and their description is omitted.

Figure 15:
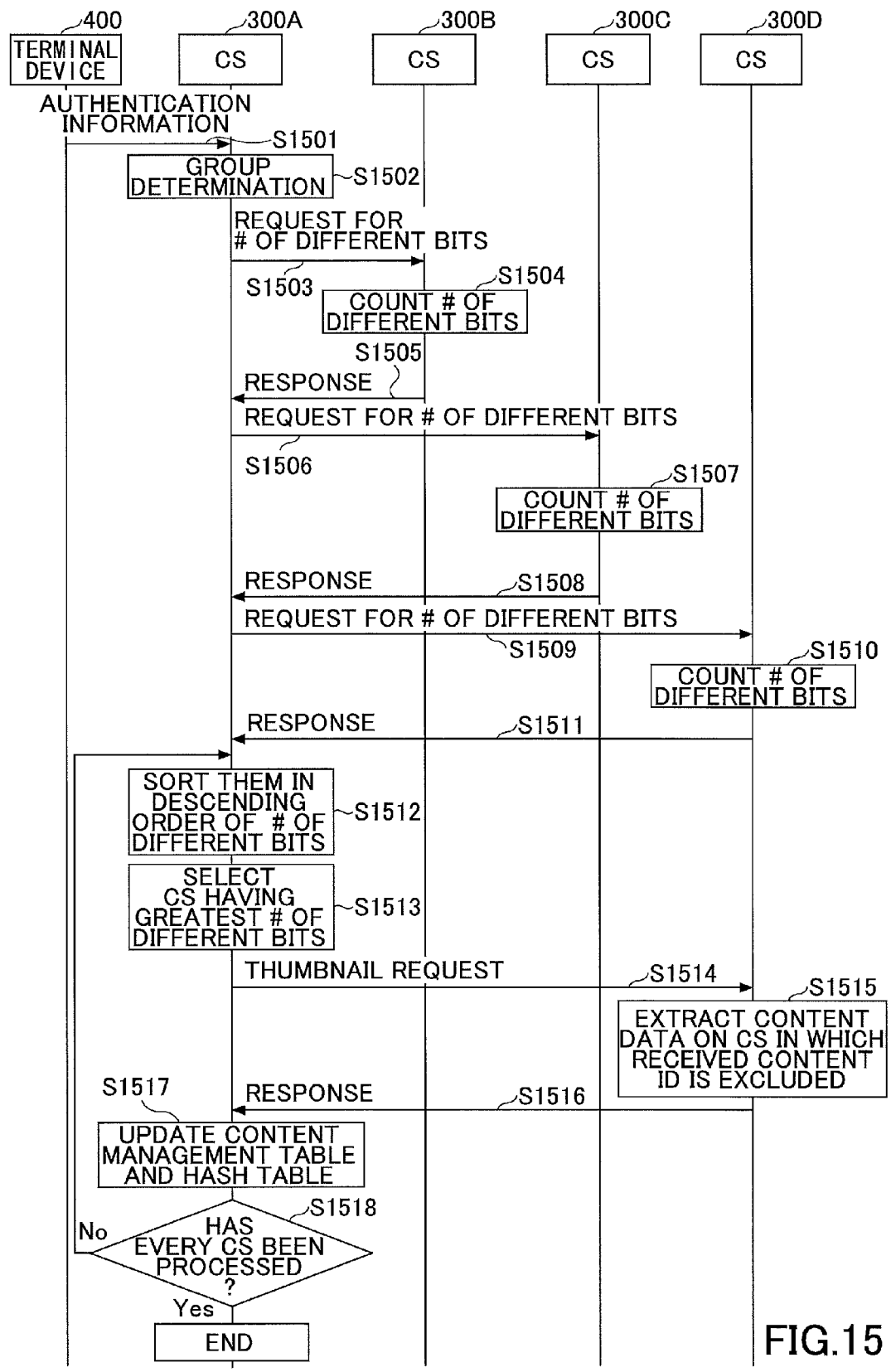
FIG. 15 is a sequence chart illustrating operations of a cache server according to a second embodiment.

FIG. 15 is a sequence chart illustrating operations of a cache server 300 according to the second embodiment.

Steps S1501-1502 in FIG. 15 are the same as Steps S1201-S1202 in FIG. 12, and their description is omitted.

The cache server 300A makes an obtainment request for the number of bits having 1 when taking logical exclusive OR with the bit array of the cache server 300B (Step S1503). In response to receiving the obtainment request for the number of bits, the cache server 300B compares the bit array of the requesting cache server 300A with its own bit array. Then, the cache server 300B counts the number of bits in its own bit array that have 1 when taking logical exclusive OR with bits having 0 in the bit array of the cache server 300A (Step S1504). Next, the cache server 300B transmits the counted number of bits to the cache server 300A (Step S1505).

Next, the cache server 300A makes an obtainment request for the number of bits having 1 when taking logical exclusive OR with the bit array of the cache server 300C (Step S1506). In response to receiving the obtainment request for the number of bits, the cache server 300C compares the bit array of the requesting cache server 300A with its own bit array. Then, the cache server 300C counts the number of bits in its own bit array that have 1 when taking logical exclusive OR with bits having 0 in the bit array of the cache server 300A (Step S1507). Next, the cache server 300C transmits the counted number of bits to the cache server 300A (Step S1508).

Next, the cache server 300A makes an obtainment request for the number of bits having 1 when taking logical exclusive OR with the bit array of the cache server 300D (Step S1509). In response to receiving the obtainment request for the number of bits, the cache server 300D compares the bit array of the requesting cache server 300A with its own bit array. Then, the cache server 300D counts the number of bits in its own bit array that have 1 when taking logical exclusive OR with bits having 0 in the bit array of the cache server 300A (Step S1510). Next, the cache server 300D transmits the counted number of bits to the cache server 300A (Step S1511).

Next, the cache server 300A has the query order determination unit 315 determine a query order, prioritizing a cache server 300 that has a greater counted number of bits (Step S1512).

Steps S1513-1518 are the same as Steps S1210-S1215 in FIG. 12, and their description is omitted.

As described above, counting of the number of bits that have 1 when taking logical exclusive OR with bits having 0 in the bit array of the cache server 300A can be distributed to the other cache servers 300 in the present embodiment. Therefore, processing load of the cache server 300A can be reduced according to the present embodiment.

Third Embodiment

In the following, the third embodiment will be described with reference to the drawing. The third embodiment differs from the first embodiment in that a hash value is associated with multiple pieces of content data. Therefore, in the following description of the third embodiment, only different points from the first embodiment will be described, elements having substantially the same functional configurations are assigned the same numerical codes as in the description of the first embodiment, and their description is omitted.

FIGS. 16A-16D are schematic views illustrating an example of bit arrays corresponding to content data held by cache servers according to the third embodiment.

FIG. 16A illustrates a bit array that corresponds to content data held in the cache server 300A, which is the same as in FIG. 11A, and its description is omitted.

FIG. 16B illustrates a bit array that corresponds to content data held in the cache server 300B, which is the same as in FIG. 11B, and its description is omitted.

FIG. 16C illustrates a bit array that corresponds to content data held in the cache server 300C.

In the cache server 300C in the present embodiment, the hash value 1 is associated with a piece of content data that has the title "Jet". On the other hand, the hash value 5 is associated with two pieces of content data that have the titles of "Dolphin" and "kiwi", respectively.

Also, in the cache server 300C, the hash value 7 is associated with a piece of content data that has the title "Egg", and the hash value 8 is associated with a piece of content data that has the title "Apple". Therefore, the bit array of the cache server 300C has the bit value of 1 at the first, fifth, seventh and eighth bits, and the bit value of 0 at the other bits.

FIG. 16D illustrates a bit array that corresponds to content data held in the cache server 300D, which is similar to that in FIG. 11D, and its description is omitted.

In the following, operations of the cache server 300A will be described in which the cache server 300A receives authentication information from a terminal device 400 when content data held by the cache servers 300 has states as illustrated in FIGS. 11A-11D.

Figure 17:
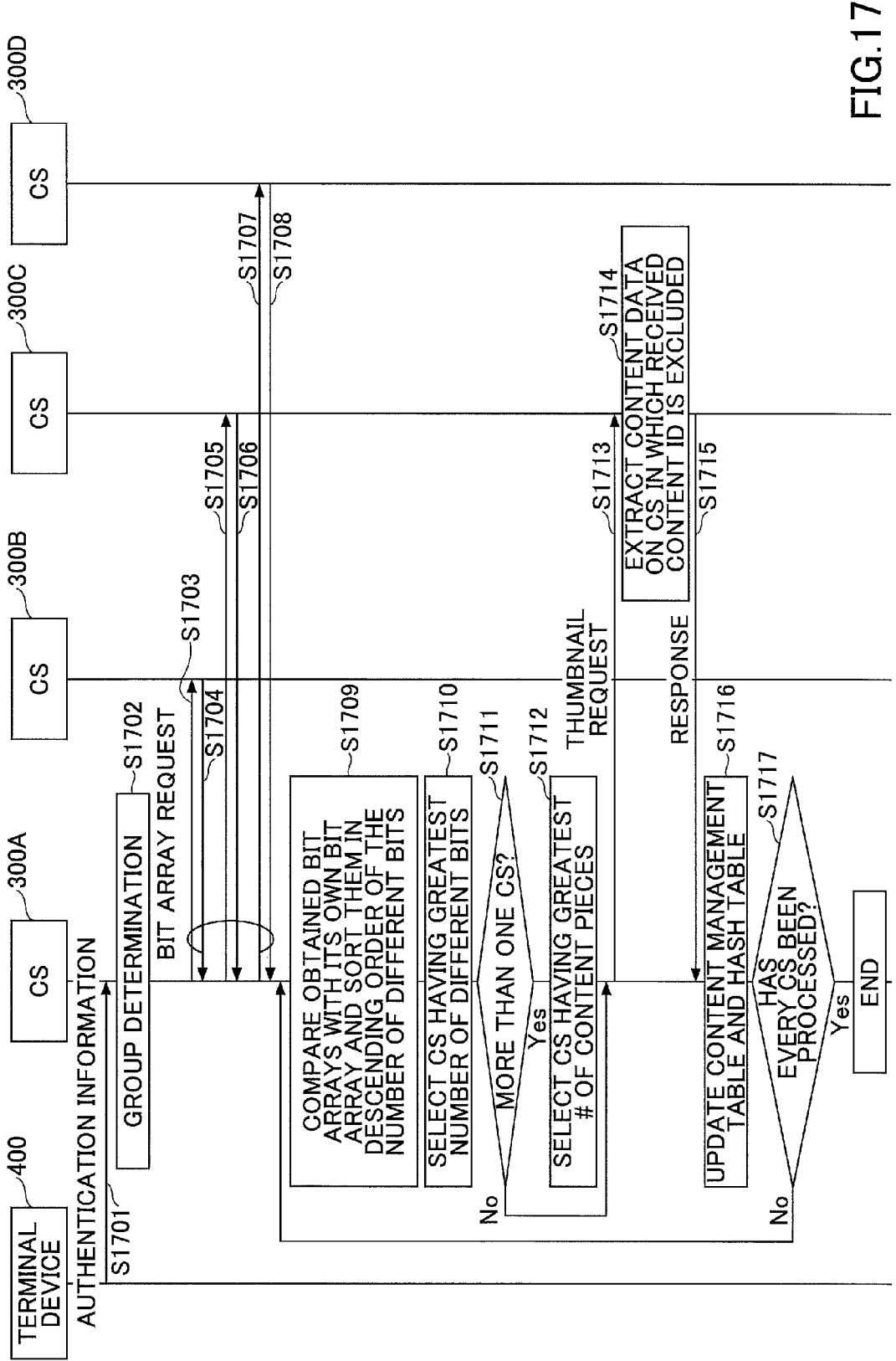
FIG. 17 is a sequence chart illustrating operations of a cache server according to the third embodiment.

FIG. 17 is a sequence chart illustrating operations of the cache server 300A according to the third embodiment.

Steps S1701-1710 in FIG. 17 are the same as Steps S1201-S1210 in FIG. 12, and their description is omitted.

Following Step S1710, the cache server 300A has the query order determination unit 315 determine whether multiple cache servers 300 are selected (Step S1711).

If it is determined at Step S1711 that multiple cache servers 300 are selected, the query order determination unit 315 selects a cache server 300 that has the greatest number of pieces of content data (Step S1712). If it is determined at Step S1711 that multiple cache servers 300 are not selected, the cache server 300A goes forward to Step S1713.

Steps S1713-1717 in FIG. 17 are the same as Steps S1211-S1215 in FIG. 12, and their description is omitted.

In the following, Steps S1711-1712 will be further described.

In the present embodiment, the bit array obtained from the cache server 300C has three bits that have 1 when taking logical exclusive OR with bits having 0 in the bit array of the cache server 300A, which turns out to be one of the bit arrays having the greatest number of bits (see FIG. 16C). Also, the bit array obtained from the cache server 300D also has three bits that have 1 when taking logical exclusive OR with bits having 0 in the bit array of the cache server 300A (see FIG. 16D). Therefore, the cache servers 300C and 300D are selected at Step S1710.

In this case, the query order determination unit 315 refers to the content management tables 332 in the cache server 300C and 300D to obtain the numbers of pieces of content data held by the cache server 300C and 300D, respectively. Specifically, the cache server 300A may refer to a content ID that is stored last in the content management tables 332 of the cache servers 300C and 300D to obtain the total numbers of pieces of content data.

Next, the query order determination unit 315 compares the obtained total numbers of pieces of content data, to determine a query order of making obtainment requests for thumbnails in descending order of the total number of pieces of content data. In this case, the number of pieces of content data is four in the cache server 300C, and three in the cache server 300D. Therefore, the query order determination unit 315 selects the cache server 300C at Step S1712.

Note that although the query order is a descending order of the total number of pieces of content data in the present embodiment, it is not limited to that. The query order may be a descending order of the number of pieces of content data that are associated with hash values corresponding to bits that have 1 when taking logical exclusive OR with bits having 0 in the bit array of the cache server 300A, which is determined with reference to, for example, the hash table 334.

As described above, more thumbnails can be collected until receiving a reference request from a terminal device 400, by making obtainment requests for thumbnails starting from a cache server 300 holding the greatest number of content data in the present embodiment.

Fourth Embodiment

In the following, the fourth embodiment will be described with reference to the drawing. The fourth embodiment differs from the third embodiment in that an order of making obtainment requests for thumbnails is determined based on response times of the cache servers 300. Therefore, in the following description of the fourth embodiment, only different points from the third embodiment will be described, elements having substantially the same functional configurations are assigned the same numerical codes as in the description of the third embodiment, and their description is omitted.

Figure 18:
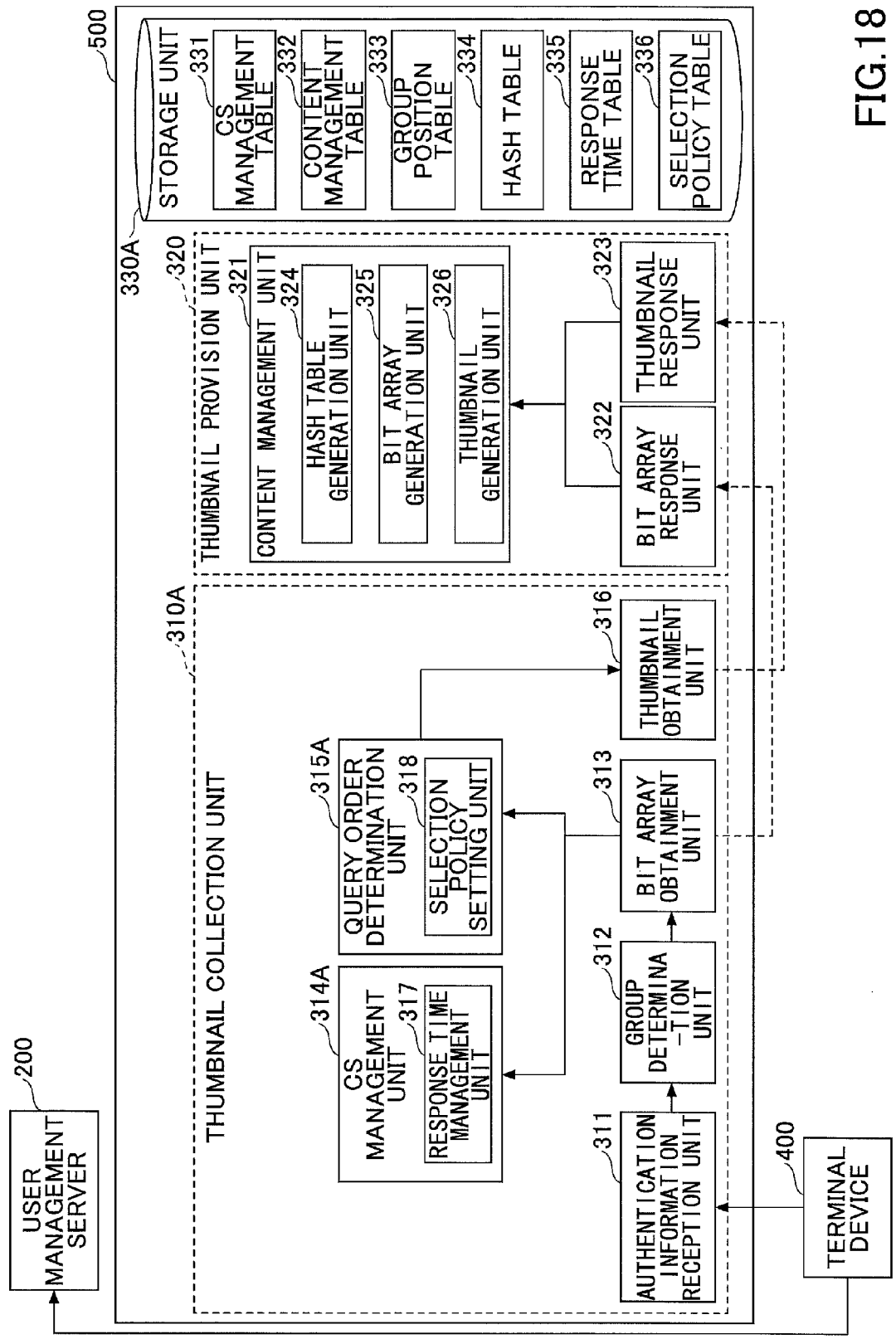
FIG. 18 is a schematic view illustrating functions of a cache server according to a fourth embodiment.

FIG. 18 is a schematic view illustrating functions of a cache server 500 according to the fourth embodiment.

The cache server 500 in the present embodiment includes a thumbnail collection unit 310A and a storage unit 330A.

The thumbnail collection unit 310A in the present embodiment includes a CS management unit 314A and a query order determination unit 315A.

The CS management unit 314A includes a response time management unit 317. The response time management unit 317 manages a response time from another cache server 500 for a request to the other cache server 500 made by the cache server 500A. Specifically, the response time management unit 317 measures a response time from the other cache server 500, to store it in a response time table 335, which will be described later.

The query order determination unit 315A includes a selection policy setting unit 318. The selection policy setting unit 318 sets a selection policy that indicates priority to be taken care of when determining a query order. The selection policy setting unit 318, which will be specifically described later, refers to the selection policy table 336 to set the selection policy.

The storage unit 330A in the present embodiment includes the response time table 335 and the selection policy table 336 in addition to the tables included in the storage unit 330 in the first embodiment.

Figure 19:
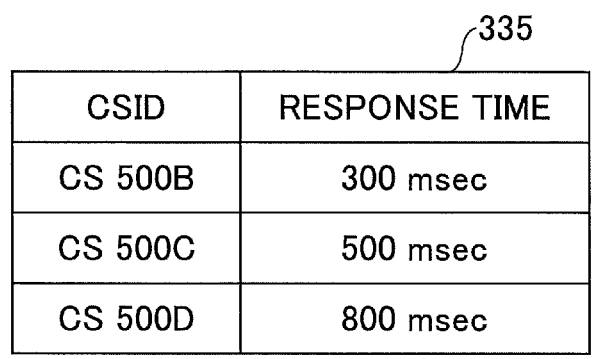
FIG. 19 is a schematic view illustrating an example of a response time table.

FIG. 19 is a schematic view illustrating an example of a response time table.

In the response time table 335 in the present embodiment, the CSID of a cache server 500 is associated with a response time. In FIG. 19, for example, the cache server 500B takes a response time of 300 ms for making a response after receiving a query from another cache server 500. The response time may change, for example, depending on the distance between the cache server 500 and the cache server 500B.

Figure 20:
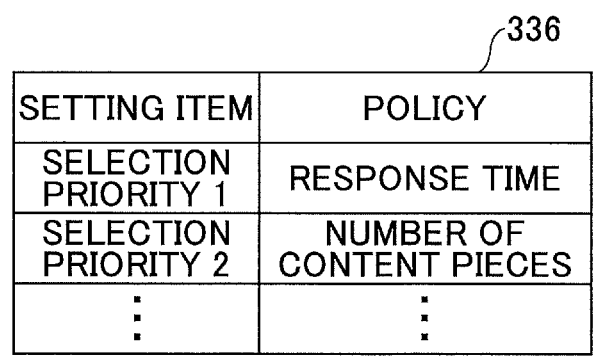
FIG. 20 is a schematic view illustrating an example of a selection policy table.

FIG. 20 is a schematic view illustrating an example of a selection policy table. In the selection policy table 336 in the present embodiment, a setting item is associated with a selection policy.

If "select priority 1" is selected in the selection policy table 336, the query order determination unit 315A in the present embodiment determines a query order by prioritizing with response time. Also, if "select priority 2" is selected in the selection policy table 336, the query order determination unit 315A in the present embodiment determines a query order by prioritizing with the number of pieces of content data held in the other cache server 500.

Figure 21:
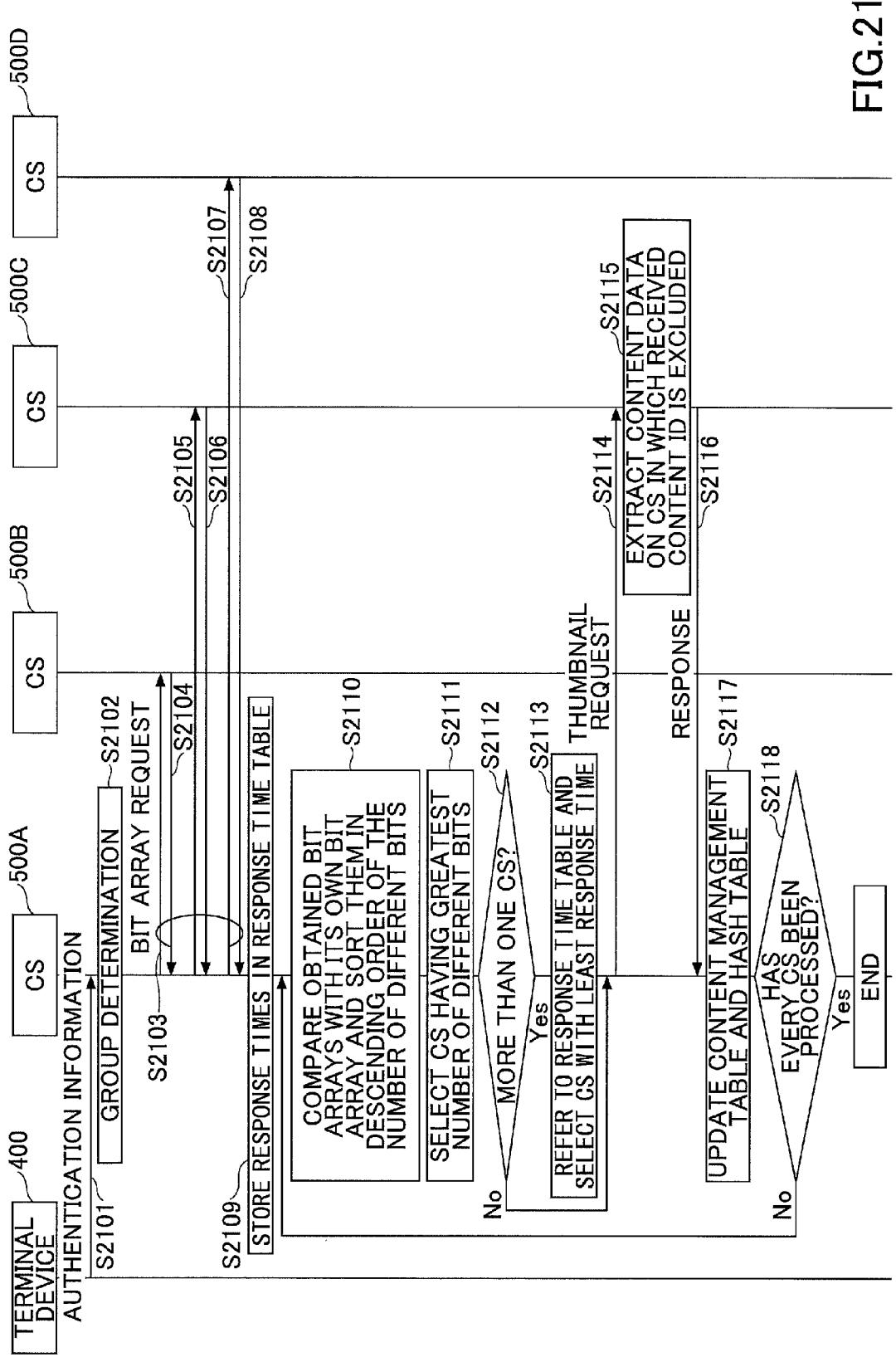
FIG. 21 is a sequence chart illustrating operations of a cache server according to the fourth embodiment.

In the following, operations of the cache server 500 in the present embodiment will be described with reference to FIG. 21. FIG. 21 is a sequence chart illustrating operations of the cache server 500 according to the fourth embodiment. FIG. 21 illustrates operations of the cache server 500A in a case where "select priority 1" is selected in the selection policy table 336. Note that operations of the cache server 500A in a case where "select priority 2" is selected in the selection policy table 336 are substantially the same as those described in the third embodiment.

Steps S2101-2108 in FIG. 21 are the same as Steps S1701-S1708 in FIG. 17, and their description is omitted.

Next, the cache server 500A stores response times of the cache servers 500 measured by the response time management unit 317 in the response time table 335 (Step S2109).

Steps S2110-2112 in FIG. 21 are the same as Steps S1709-S1711 in FIG. 17, and their description is omitted.

If it is determined at Step S2112 that multiple cache servers 500 are selected, the query order determination unit 315A refers to the response time table 335, and selects a cache server 500 having the least response time among the multiple cache servers 500 (Step S2113).

Steps S2114-2118 in FIG. 21 are the same as Steps S1713-S1717 in FIG. 17, and their description is omitted.

As described above, an order of making obtainment requests for thumbnails is determined in ascending order of response times if there are multiple cache servers 500 that have the same number of bits that have 1 when taking logical exclusive OR with bits having 0 in the bit array of the cache server 500A in the present embodiment. In the present embodiment, more thumbnails can be collected until receiving a reference request from a terminal device 400, by determining an order of making obtainment requests for thumbnails as described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A content distribution method executed by a computer, the method comprising:
   determining, upon receiving authentication information indicating a group, whether a terminal device of the group exists in a network area of the computer;
   referring to a result of comparing information identifying content data stored in a storage device with information identifying content data stored in one or more other storage devices included in one or more other computers, with respect to the authentication information indicating the group of the terminal device that does not exist in the network area of the computer;
   collecting representative image data of content data not stored in the storage device from the one or more other storage devices included in the one or more other computers storing the content data not stored in the storage device, starting from one of the one or more other computers having a greatest number of pieces of the content data; and
   transmitting a list of the representative image data being collected to a sender of the authentication information, when a reference request is received from the sender.

2. The content distribution method as claimed in claim 1, wherein the information identifying the content data stored in the storage device includes a representative value of a piece of the content data and a bit array representing whether the piece of the content data is included in the storage device.

3. The content distribution method as claimed in claim 2, wherein the referring generates a hash value using data included in the piece of the content data stored in the storage device, and a hash table associating the hash value with the piece of the content data represented by the hash value, wherein the referring generates the bit array in which a bit value of a bit corresponding to the hash value is set to 1 if the piece of the content data associated with the hash value exists in the storage device, or the bit value of the bit corresponding to the hash value is set to 0 if the piece of the content data associated with the hash value does not exist in the storage device.

4. The content distribution method as claimed in claim 3, wherein the referring refers to the result of comparing the bit values of the bit array generated at the computer with the bit values of the bit arrays generated at the one or more other computers,
   wherein the collecting collects the representative image data of the content data, starting from the one of the one or more other computers having a greatest number of bits in the bit array that have 1 when taking logical exclusive OR with bits having 0 in the bit array generated at the computer.

5. The content distribution method as claimed in claim 4, wherein the collecting transmits the bit array generated at the computer to the one or more other computers, and receives the result comparing the bit array generated at the computer with each of the bit arrays generated at the one or more other computers where the comparison is executed on each of the one or more other computers,
   wherein the collecting collects the representative image data of the content data, starting from the one of the one or more other computers having a greatest number of bits in the bit array that have 1 when taking logical exclusive OR with bits having 0 in the bit array generated at the computer.

6. The content distribution method as claimed in claim 4, wherein if the multiple bit arrays exist having the same number of bits that have 1 when taking logical exclusive OR with bits having 0 in the bit array generated at the computer, the collecting collects the representative image data of the content data starting from the one of the one or more other computers having the greatest number of pieces of the content data.

7. The content distribution method as claimed in claim 4, wherein, if the multiple bit arrays exist having the same number of bits that have 1 when taking logical exclusive OR with bits having 0 in the bit array generated at the computer, the collecting collects the representative image data of the content data, starting from the one of the one or more other computers having a least response time for responding to a request from the computer.

8. The content distribution method as claimed in claim 1, the method further comprising:
   determining whether the one or more other computers, which are included in the group to which the sender of the authentication information belongs, exist in a network area; and
   collecting the representative image data when the one or more other computers, which are included in the group to which the sender of the authentication information belongs, exists in the network area.

9. The content distribution method as claimed in claim 1, wherein the determining includes
   referring to a group position table in which a group ID assigned to the terminal devices is associated with computers, and
   determining that the terminal device, to which the group ID is assigned, does not exist, for the group ID that is included in the authentication information and does not exist in the group position table; and
   wherein the method further comprises updating the group position table by storing the group ID included in the authentication information, and sends an updated group position table to the one or more other computers.

10. A content distribution server implemented by a computer, comprising:
   a memory; and
   a processor coupled to the memory and the processor configured to:
      determine, upon receiving authentication information indicating a group, whether a terminal device of the group exists in a network area of the computer;
      compare information identifying content data stored in a storage device of the computer with information identifying content data stored in one or more other storage devices included in one or more other computers, with respect to the authentication information indicating the group of the terminal device that does not exist in the network area of the computer;
      collect representative image data of content data not stored in the storage device from the one or more other storage devices included in the one or more other computers storing the content data not stored in the storage device, starting from one of the one or more other computers having a greatest number of pieces of the content data; and
      transmit a list of the representative image data being collected to a sender of the authentication information, when a reference request is received from the sender.

11. The content distribution server as claimed in claim 10, wherein the processor is further configured to:
   determine whether the one or more other computers, which are included in the group to which the sender of the authentication information belongs, exist in a network area; and
   collect the representative image data when the one or more other computers, which are included in the group to which the sender of the authentication information belongs, exists in the network area.

12. The content distribution server as claimed in claim 10, wherein the memory stores a group position table in which a group ID assigned to the terminal devices is associated with computers;
   wherein when determining, upon receiving authentication information indicating a group, whether a terminal device of the group exists in a network area of the computer, the processor
      refers to the group position table, and
      determines that the terminal device, to which the group ID is assigned, does not exist, for the group ID that is included in the authentication information and does not exist in the group position table; and
   wherein the processor is further configured to update the group position table by storing the group ID included in the authentication information, and sends an updated group position table to the one or more other computers.

13. A non-transitory recording medium storing a program that causes a computer to execute a process comprising:
   determining, upon receiving authentication information indicating a group, whether a terminal device of the group exists in a network area of the computer;
   referring to a result of comparing information identifying content data stored in a storage device with information identifying content data stored in one or more other storage devices included in one or more other computers, with respect to the authentication information indicating the group of the terminal device that does not exist in the network area of the computer; and
   collecting representative image data of content data not stored in the storage device from the one or more other storage devices included in the one or more other computers storing the content data not stored in the storage device, starting from one of the one or more other computers having a greatest number of pieces of the content data; and
   transmitting a list of the representative image data being collected to a sender of the authentication information, when a reference request is received from the sender.

14. The computer-readable recording medium as claimed in claim 13, the process further comprising:
   determining whether the one or more other computers, which are included in the group to which the sender of the authentication information belongs, exist in a network area; and
   collecting the representative image data when the one or more other computers, which are included in the group to which the sender of the authentication information belongs, exists in the network area.

15. The computer-readable recording medium as claimed in claim 13,
   wherein the determining includes
      referring to a group position table in which a group ID assigned to the terminal devices is associated with computers, and
      determines that the terminal device, to which the group ID is assigned, does not exist, for the group ID that is included in the authentication information and does not exist in the group position table; and
   wherein the process further comprises updating the group position table by storing the group ID included in the authentication information, and sends an updated group position table to the one or more other computers.

* * * * *